(12) United States Patent
Kim (10) Patent No.: US 9,499,054 B2
(45) Date of Patent: Nov. 22, 2016

(54) CHARGE DEPLETING MODE CONTROL SYSTEM FOR PLUG-IN HYBRID VEHICLE AND METHOD THEREOF

(71) Applicant: Hyundai Motor Company, Seoul (KR)

(72) Inventor: Insup Kim, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 169 days.

(21) Appl. No.: 14/484,083

(22) Filed: Sep. 11, 2014

(65) Prior Publication Data

US 2015/0120118 A1 Apr. 30, 2015

(30) Foreign Application Priority Data

Oct. 31, 2013 (KR) .................. 10-2013-0131572

(51) Int. Cl.
  *B60W 20/00* (2016.01)
  *B60L 7/12* (2006.01)
  *B60L 11/14* (2006.01)
  (Continued)

(52) U.S. Cl.
  CPC .............. *B60L 7/12* (2013.01); *B60L 11/14* (2013.01); *B60L 11/1816* (2013.01); *B60L 11/1861* (2013.01); *B60L 11/1894* (2013.01); *B60L 15/2009* (2013.01); *B60L 15/2054* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/486* (2013.01); *B60L 2240/642* (2013.01); *B60L 2260/26* (2013.01); *Y02T 10/645* (2013.01); *Y02T 10/70* (2013.01); *Y02T 10/705* (2013.01); *Y02T 10/7044* (2013.01); *Y02T 10/7072* (2013.01); *Y02T 10/7077* (2013.01); *Y02T 10/72* (2013.01); *Y02T 10/7275* (2013.01); *Y02T 10/7291* (2013.01); *Y02T 90/14* (2013.01); *Y02T 90/16* (2013.01); *Y02T 90/34* (2013.01)

(58) Field of Classification Search
None
See application file for complete search history.

(56) References Cited

U.S. PATENT DOCUMENTS 7,167,783 B2 * 1/2007 Park .................. B60K 6/48
  303/152
9,168,824 B2 * 10/2015 Lee .................. B60K 6/365
(Continued)

FOREIGN PATENT DOCUMENTS

JP 2013-174299 A 9/2013
KR 10-0867808 B1 11/2008
(Continued)

*Primary Examiner* — Jonathan M Dager
(74) *Attorney, Agent, or Firm* — McDermott Will & Emery LLP (57) ABSTRACT

A charge depleting mode control apparatus of a plug-in hybrid vehicle includes a driving information detector, a mode determining unit, a shift-speed determining unit, a shift determining unit. The driving information detector detects driving information of a vehicle. The mode determining unit determines whether a charge depleting (CD) mode is entered by using a state of charge (SOC) of a battery provided from the driving information detector. The shift-speed determining unit determines a target shift-speed when the mode determining unit determines to enter the CD mode. The shift determining unit determines whether to change the shift-speed determined by the shift-speed determining unit. The shift-speed is determined by using transmission efficiency and motor efficiency when the plug-in hybrid vehicle drives in the CD mode, such that fuel consumption is reduced and performance is improved.

5 Claims, 7 Drawing Sheets

(51) Int. Cl.
  *B60L 11/18* (2006.01)
  *B60L 15/20* (2006.01)

(56) References Cited

U.S. PATENT DOCUMENTS

| | | | | |
|---|---|---|---|---|
| 2005/0139035 A1* | 6/2005 | Lee | B60K 6/36 | 74/661 |
| 2006/0006734 A1* | 1/2006 | Tabata | B60K 6/445 | 303/3 |
| 2006/0276288 A1* | 12/2006 | Iwanaka | B60K 6/365 | 475/5 |
| 2007/0227790 A1* | 10/2007 | Tanishima | B60K 6/48 | 180/65.245 |
| 2007/0275823 A1* | 11/2007 | Motosugi | B60K 6/48 | 477/176 |
| 2008/0254934 A1* | 10/2008 | Kumazaki | B60K 6/40 | 477/3 |
| 2009/0088291 A1* | 4/2009 | Kumazaki | B60W 10/02 | 477/35 |
| 2009/0093331 A1* | 4/2009 | Iwanaka | B60K 6/365 | 475/5 |
| 2009/0270213 A1* | 10/2009 | Min | B60K 6/365 | 475/151 |
| 2010/0125396 A1* | 5/2010 | Hsu | F16H 61/0031 | 701/55 |
| 2011/0021312 A1* | 1/2011 | Fukitani | B60K 6/48 | 477/5 |
| 2011/0245003 A1* | 10/2011 | Takami | B60K 6/365 | 475/5 |
| 2011/0313602 A1* | 12/2011 | Hirata | B60K 6/365 | 701/22 |
| 2011/0320077 A1* | 12/2011 | Choi | B60K 6/48 | 701/22 |
| 2012/0072061 A1* | 3/2012 | Kim | B60W 10/06 | 701/22 |
| 2012/0081070 A1* | 4/2012 | Wook | B60L 11/1862 | 320/109 |
| 2012/0083953 A1* | 4/2012 | Izawa | B60W 30/20 | 701/22 |
| 2012/0090950 A1* | 4/2012 | Shin | F16D 48/0206 | 192/12 C |
| 2012/0101676 A1* | 4/2012 | Ichioka | B60K 6/445 | 701/22 |
| 2012/0109443 A1* | 5/2012 | Takahashi | B60L 1/003 | 701/22 |
| 2012/0199437 A1* | 8/2012 | Okuda | B60K 6/48 | 192/85.63 |
| 2012/0316021 A1* | 12/2012 | Kim | B60K 6/365 | 475/5 |
| 2012/0322601 A1* | 12/2012 | Kim | F16H 3/728 | 475/5 |
| 2012/0322602 A1* | 12/2012 | Kim | B60K 6/365 | 475/5 |
| 2013/0030637 A1* | 1/2013 | Yamamoto | B60K 6/445 | 701/22 |
| 2013/0131941 A1* | 5/2013 | Kitahata | B60K 6/38 | 701/58 |
| 2013/0218391 A1* | 8/2013 | Aizawa | B60L 11/14 | 701/22 |
| 2013/0226387 A1* | 8/2013 | Hayashi | B60K 6/442 | 701/22 |
| 2013/0253743 A1* | 9/2013 | Maruyama | B60K 6/442 | 701/22 |
| 2013/0268182 A1* | 10/2013 | Treharne | F02N 11/0829 | 701/113 |
| 2013/0307449 A1* | 11/2013 | Kobayashi | B60K 6/48 | 318/400.02 |
| 2014/0012449 A1* | 1/2014 | Arita | B60W 20/00 | 701/22 |
| 2014/0046525 A1* | 2/2014 | Lee | B60W 10/10 | 701/22 |
| 2014/0081490 A1* | 3/2014 | Adelman | B23P 23/04 | 701/22 |
| 2014/0148985 A1* | 5/2014 | Sato | B60W 20/00 | 701/22 |
| 2014/0349809 A1* | 11/2014 | Kim | B60W 20/10 | 477/4 |
| 2015/0006063 A1* | 1/2015 | Takahashi | B60K 6/48 | 701/110 |

FOREIGN PATENT DOCUMENTS

KR   10-2012-0021094 A   3/2012
KR   10-2013-0036049 A   4/2013

\* cited by examiner

CHARGE DEPLETING MODE CONTROL SYSTEM FOR PLUG-IN HYBRID VEHICLE AND METHOD THEREOF

CROSS-REFERENCE TO RELATED APPLICATION

This application claims benefit of priority to Korean Patent Application No. 10-2013-0131572 filed in the Korean Intellectual Property Office on Oct. 31, 2013, the entire contents of which are incorporated herein by reference.

TECHNICAL FIELD

The present inventive concept relates to a charge depleting mode control apparatus of a plug-in hybrid vehicle and a method thereof. More particularly, the present inventive concept relates to a charge depleting mode control apparatus of a plug-in hybrid vehicle and a method of determining a shift-speed by using transmission efficiency and motor efficiency when a plug-in hybrid vehicle drives in a charge depleting mode, to improve fuel consumption.

BACKGROUND

Various environmentally-friendly vehicles including a fuel cell vehicle, an electric vehicle, a hybrid vehicle, and a plug-in hybrid vehicle are provided for improving fuel consumption under the enhanced regulations of exhaust gas.

A plug-in hybrid vehicle can charge by using common AC power, and drives in a charge depleting mode (CD mode) and a charge sustaining mode (CS mode) according to a state of charge (SOC) of a battery.

The CD mode is an electric vehicle (EV) mode of driving by using power charged in the battery. In the CD mode, the SOC of the battery is good and available power is sufficient, therefore the vehicle generally drives by using power of a motor except under special circumstances.

The CS mode is the same as the hybrid electric vehicle (HEV) mode of driving by combining power of the engine and the motor after usage of power charges in the battery. In the CS mode, since the SOC of the battery is not sufficient and usable power is relatively low, the vehicle is driven by combining power of the engine and the motor, so it is possible to improve fuel consumption and appropriately maintain the SOC of the battery.

In CS mode of the plug-in hybrid vehicle, shifting control can be performed the same as a conventional hybrid vehicle. That is, in the CS mode, the shift-speed is determined according to the engine efficiency.

However, in the CD mode, since the engine is virtually not operated and the plug-in hybrid vehicle drives by discharging the battery, it needs to minimize fuel consumption when shift-speed change is performed.

The above information disclosed in this Background section is only for enhancement of understanding of the background of the inventive concept and therefore it may contain information that does not form the prior art that is already known in this country to a person of ordinary skill in the art.

SUMMARY

The present inventive concept has been made in an effort to provide a charge depleting mode control apparatus of a plug-in hybrid vehicle and a method of determining shift-speed considering motor efficiency and transmission efficiency when the vehicle drives in a charge depleting mode, such that fuel consumption can be reduced and performance can be improved.

Further, the present inventive concept has been made in an effort to provide a charge depleting mode control apparatus of a plug-in hybrid vehicle and a method of determining whether to shift a speed by comparing system efficiency with a loss rate generated at a shift-speed and minimizes a loss generated at a shifting speed One aspect of the present inventive concept relates to a charge depleting mode control apparatus of plug-in hybrid vehicle including a driving information detector, a mode determining unit, a shift-speed determining unit and a shift determining unit. The driving information detector detects driving information of a vehicle. The mode determining unit determines whether a charge depleting (CD) mode is entered by using a state of charge (SOC) of a battery, provided from the driving information detector. The shift-speed determining unit determines a target shift-speed when the mode determining unit determines to enter the CD mode. The shift determining unit determines whether to change the shift-speed determined by the shift-speed determining unit.

The mode determining unit may determine the CD mode when a current driving mode is the CD mode and a current SOC provided from the driving information detector is higher than an SOC for entering a charge sustaining (CS) mode, or when the current driving mode is the CS mode and the current SOC provided from the driving information detector is higher than an SOC for reentering the CD mode.

The shift-speed determining unit may calculate system efficiency by using transmission efficiency and motor efficiency, and determine a most efficient shift-speed as the target shift-speed.

The shift determining unit may determine whether a shift-speed is shifted by comparing the system efficiency calculated by the shift-speed determining unit with a system loss rate generated at a shift.

The shift determining unit may change speed when a system efficiency increasing rate that is generated when changing a speed to the target shift-speed is higher than a mechanical loss rate that is generated when changing the speed to the target shift-speed.

The mode determining unit may determine to enter the CD mode by the SOC of the battery.

The charge depleting mode control apparatus may further include an engine operation determining unit determines whether an engine operation is needed.

Another aspect of the present inventive concept encompasses a charge depleting mode control method of a plug-in hybrid vehicle including determining, by a mode determining unit, whether to entering a charge depleting (CD) mode from a state of charge (SOC_ of a battery. A target shift-speed is determined by a shift-speed determining unit when entering the CD mode. It is determined whether to change the target shift-speed by a shift determining unit.

In the determining of the CD mode, it may be determined to the enter charge depleting mode when a current driving mode is the CD mode and a current SOC is higher than an SOC for reentering a charge sustaining (CS) mode, or when the current driving mode is the CS mode and the current SOC is higher than an SOC for reentering the CD mode.

In the determining of the CD mode, it may be determined whether a required torque of a vehicle is higher than zero, input torque and an input speed of a transmission for acceleration or deceleration may be calculated according to a result of the determination whether the required torque is higher than zero, transmission efficiency may be calculated from a predetermined efficiency by using the input torque and the input speed of the transmission, motor efficiency may be calculated from the predetermined efficiency by using the input torque and the input speed of the transmission, system efficiency may be calculated for each shift-speed by using the transmission efficiency and the motor efficiency, and the target shift-speed may be determined from system efficiency for each shift-speed.

In the determining whether to change to the target shift-speed, it may be determined to change a shift-speed when a system efficiency increasing rate is higher than a mechanical loss rate by comparing the system efficiency increasing rate that is generated when changing speed to the target shift-speed with the mechanical loss rate that is generated when changing the speed to the target shift-speed.

In the determining of whether to enter the charge deleting mode, it may be determined whether to operate an engine when the mode determining unit determines to enter the CD mode.

DETAILED DESCRIPTION

In the following detailed description, only certain exemplary embodiments of the present inventive concept have been shown and described, simply by way of illustration.

As those skilled in the art would realize, the described embodiments may be modified in various different ways, all without departing from the spirit or scope of the present inventive concept.

The drawings and description are to be regarded as illustrative in nature, and not restrictive. Like reference numerals designate like elements throughout the specification.

In the drawings, the sizes and thicknesses of the components are merely shown for convenience of explanation, and therefore the present inventive concept is not necessarily limited to the illustrations described and shown herein.

Figure 1:
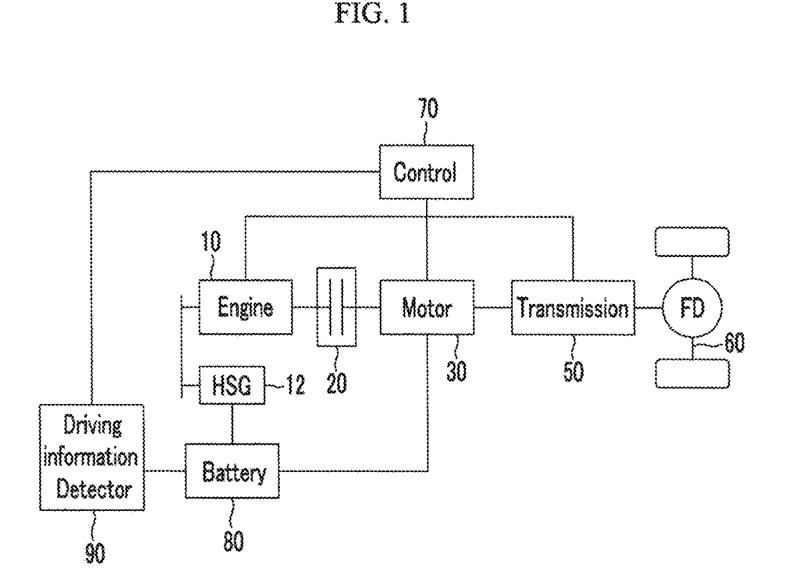
FIG. 1 is a schematic view illustrating a charge depleting mode control apparatus of a plug-in hybrid vehicle according to an exemplary embodiment of the present inventive concept.

FIG. 1 is a schematic view illustrating a charge depleting mode control apparatus of a plug-in hybrid vehicle according to an exemplary embodiment of the present inventive concept.

As shown in FIG. 1, a charge depleting mode control apparatus of a plug-in hybrid vehicle (hereinafter referred to as a "vehicle") according to an exemplary embodiment of the present inventive concept may include an engine 10 generating power, an engine clutch 20 provided between the engine and a motor 30, a transmission 50 that transforms the power generated from the engine 10 and motor 30 to an axle shaft 60 at a required speed, and a controller 70 for controlling engagement and release of the engine clutch 20 and controlling change of shift-speed of the transmission 50.

A hybrid start generator (HSG) 12 may be provided at the engine 10 for igniting a fuel of a cylinder provided in the engine 10. The motor 30 may support power of the engine 10 while the vehicle is driving, and the motor 30 may be operated as a generator while the vehicle is in a regenerative braking condition to charge a battery 80.

A driving information detector 90 may be provided in the controller 70. The driving information detector 90 may detect overall driving information including vehicle speed, displacement of an accelerator pedal, and SOC of the battery, and may provide the driving information to the controller 70.

Figure 2:
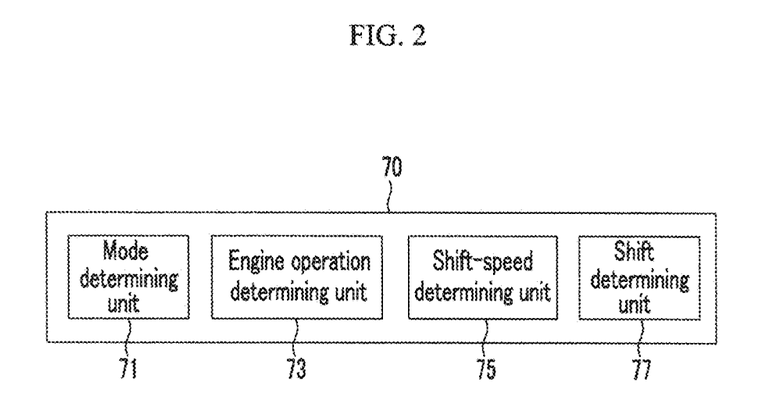
FIG. 2 is a block diagram illustrating a controller of a plug-in hybrid vehicle according to an exemplary embodiment of the present inventive concept.

Referring to FIG. 2, the controller 70 may include a mode determining unit 71 for determining whether a charge depleting mode is entered by using the SOC of a battery provided from the driving information detector 90, an engine operation determining unit 73 for determining whether to satisfy engine operation conditions when the mode determining unit 71 determines to enter the charge depleting mode, a shift-speed determining unit 75 for determining a target shift-speed when the mode determining unit 71 determines that the CD mode is entered, and a shift determining unit 77 for determining whether to change the shift-speed determined by the shift-speed determining unit 75.

The mode determining unit 71 may determine whether the driving mode of the vehicle is the CD mode by using the SOC of the battery. Specifically, the mode determining unit 71 may determine to enter the CD mode when the current driving mode is the CD mode and the current SOC is higher than a predetermined SOC for entering the CS mode. The mode determining unit 71 may determine to enter the CD mode when the current driving mode is the CS mode and the current SOC is higher than a predetermined SOC for reentering the charge depleting mode The engine operation determining unit 73 may determine whether the engine should be operated in special circumstances, even when the mode determining unit 71 determines to enter the CD mode. Thereby, the vehicle may not enter the CD mode and the vehicle may drive in the HEV mode while being driven by power of the engine and the motor simultaneously. In the following conditions, the vehicle may drive in the HEV mode while operating the engine.

In case of an engine starting condition, the vehicle may drive in the HEV mode when required torque of the vehicle is higher than power of the battery, when required torque of the motor is higher than a maximum torque of the motor, when an engine coolant and a catalyst of a fuel cell are warmed up, when coolant temperature is satisfied with a low temperature condition while heating the vehicle, or when the engine status is diagnosed by on board diagnostics (OBD) provided in the vehicle.

In case of an uphill condition of the vehicle, the vehicle may drive in the HEV mode when a slope of the vehicle detected by a slope sensor provided in the vehicle is greater than a predetermined slope in order to maintain uphill performance.

In case the vehicle requires a power performance condition, the vehicle may drive in the HEV mode when displacement of an accelerator pedal, measured by an APS (acceleration pedal sensor), exceeds a predetermined value in order to maintain power performance of the vehicle. Since displacement of the accelerator pedal to maintain a constant speed differs according to the vehicle speed, the predetermined value may be determined by adding a specific value according to the vehicle speed to a displacement value measured by the APS.

When the mode determining unit 71 determines that the vehicle enters CD mode, the shift-speed determining unit 75 may calculate system efficiency by using transmission efficiency and motor efficiency, and may determine the most efficient shift-speed.

Specifically, when the vehicle drives in the CD mode, an input torque and a transmission input speed necessary for driving may be calculated. The input torque and the input speed may be calculated by the following Equation 1 and Equation 2.

$$T_{drive} = \frac{T_{request}}{e_{average} \times r_{stage}} \quad \text{(Equation 1)}$$

Here, $T_{drive}$ is transmission input torque when driving, $T_{request}$ is required torque, $e_{average}$ is transmission average efficiency, and $r_{stage}$ is a gear ratio of each shift-speed.

$$V_{drive} = V_{vehicle} \times r_{stage} \quad \text{(Equation 2)}$$

Here, $V_{drive}$ is a transmission input speed when driving, $V_{vehicle}$ is a vehicle speed, and $r_{stage}$ is a gear ratio of each shift-speed.

When the vehicle brakes in the CD mode, input torque necessary to brake and a transmission input speed may be calculated.

The input torque and the input speed may be calculated by the following Equation 3 and Equation 4.

$$T_{brake} = \frac{T_{request} \times e_{average}}{r_{stage}} \quad \text{(Equation 3)}$$

Here, $T_{brake}$ is transmission input torque when braking, $e_{average}$ is transmission average efficiency, and $r_{stage}$ is a gear ratio of each shift-speed.

$$V_{brake} = V_{vehicle} \times r_{stage} \quad \text{(Equation 4)}$$

Here, $V_{brake}$ is a transmission input speed when braking, $V_{vehicle}$ is a vehicle speed, and $r_{stage}$ is a gear ratio of each shift-speed.

Transmission efficiency and motor efficiency of each shift-speed may be calculated by using the transmission input torque and transmission input speed of each shift-speed through the above equations. In this case, transmission efficiency and motor efficiency of each shift-speed can be obtained from an efficiency map made of predetermined transmission input torques and transmission input speeds.

System efficiency of each shift-speed may be calculated by using the transmission efficiency and motor efficiency obtained above. The system efficiency of each shift-speed can be obtained by multiplexing transmission input torque and transmission input speed.

The most efficient shift-speed may be determined as a target shift-speed among the system efficiencies of each shift-speed.

The shift determining unit 77 may determine whether to change the shift-speed by comparing the system efficiency determined by the shift-speed determining unit 75 with a loss rate. That is, the shift determining unit 77 may determine to change shift-speed only when the system efficiency increasing rate is higher than a mechanical loss rate by comparing the system efficiency increasing rate with the mechanical loss rate generated when shifting. Here, the system efficiency increasing rate may be obtained from the system efficiency before changing the shift-speed and the system efficiency after changing the shift-speed. If the system efficiency increasing rate is less than the mechanical loss rate, the existing shift-speed may be maintained. Here, the mechanical loss rate may be calculated from experiments of a fuel consumption loss rate generated when the shift-speed is changed at the transmission.

As described above, the shift determining unit may not change the shift-speed directly to the target shift-speed determined by the shift-speed determining unit 75, but may determine whether to change the shift-speed by comparing the system efficiency increasing rate with the mechanical loss rate. Thereby, fuel consumption caused by frequent shifting can be reduced.

Hereinafter, a charge depleting mode control method of the plug-in hybrid vehicle according to an exemplary embodiment of the present inventive concept will be described.

Figure 3:
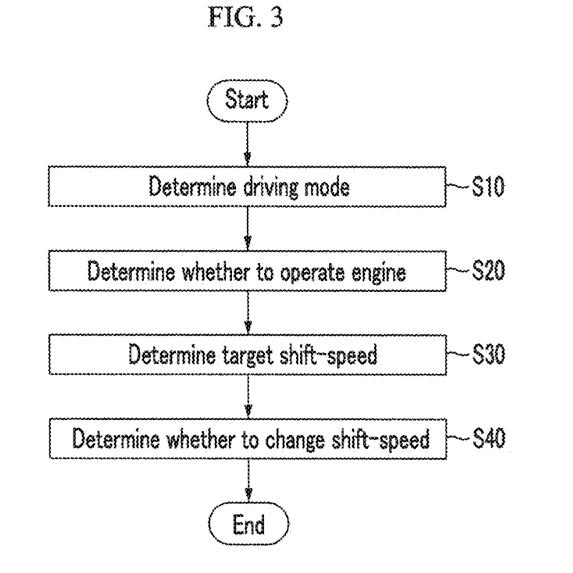
FIG. 3 is a flowchart illustrating a charge depleting mode control method of a plug-in hybrid vehicle according to an exemplary embodiment of the present inventive concept.

FIG. 3 is a flowchart illustrating a charge depleting mode control method of plug-in hybrid vehicle according to an exemplary embodiment of the present inventive concept.

As shown in FIG. 3, driving mode of the vehicle may be determined to be either CS mode or CD mode at step S10. The driving mode of the vehicle may be determined by using the SOC of the battery.

Figure 4:
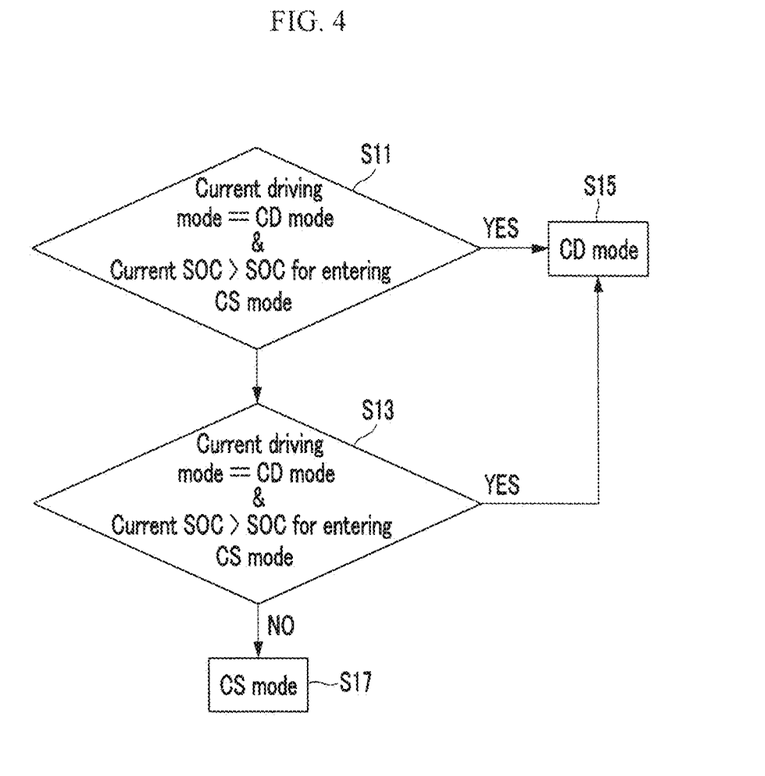
FIG. 4 is a flowchart illustrating a charge depleting mode determining method according to an exemplary embodiment of the present inventive concept.

As shown in FIG. 4, the mode determining unit may determine the CD mode at step S15 when the current driving mode is the CD mode and the current SOC is higher than the predetermined SOC for entering the CS mode at step S11.

The mode determining unit also may determine the CD mode at step 15 when the current driving mode is the CS mode and the current SOC is higher than the predetermined SOC for reentering the CD mode at step S13.

Except in the above conditions (e.g., steps 11 and 13 in FIG. 4), the mode determining unit may determine the CS mode at step S17.

Referring to FIG. 3, in step S20, the engine operation unit 73 may determine whether the engine is operated in the CD mode when the driving mode of the vehicle is determined as the CD mode by the mode determining unit at step S10.

Figure 5:
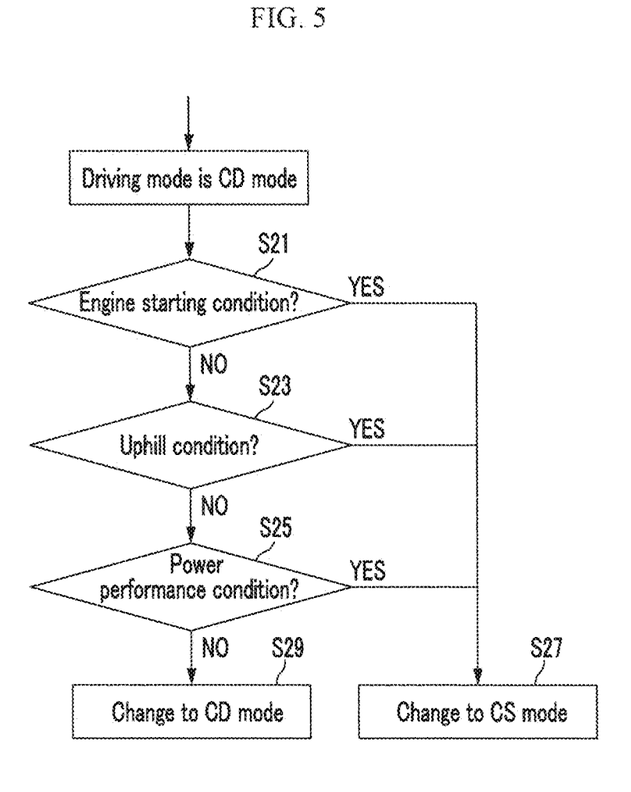
FIG. 5 is a flowchart illustrating an engine operation determining method according to an exemplary embodiment of the present inventive concept.

As shown in FIG. 5, it may need to operate the engine after entering the CD mode when the engine starting condition is satisfied at step S21. The engine starting condition may be satisfied when required torque of the vehicle is higher than power of the battery, when the required torque of the motor is higher than maximum torque of the motor, when the engine coolant and catalyst of the fuel cell is warmed up, when the coolant temperature is satisfied with the low temperature condition when heating the vehicle, or when the engine status is diagnosed by on board diagnostics (OBD) provided in the vehicle.

Or it may need to operate the engine after entering the CD mode when an uphill condition of the vehicle is satisfied at step S23. The uphill condition of the vehicle may be satisfied when the slope of the vehicle detected by the slope sensor provided in the vehicle is greater than the predetermined slope.

Or it may need to operate the engine after entering the CD mode when the required power performance condition is satisfied at step S25. The power performance condition may be satisfied when displacement of an acceleration pedal, measured by the APS (acceleration pedal sensor), exceeds the predetermined value in order to maintain power performance of the vehicle.

When the above conditions are satisfied, at step S27, it may need to operate the engine after entering the CD mode. Thereby, the vehicle changes shift-speed according to a conventional shifting method in the CS mode. When the above conditions are not satisfied, at step S29, it may need to change to the CD mode.

Figure 6:
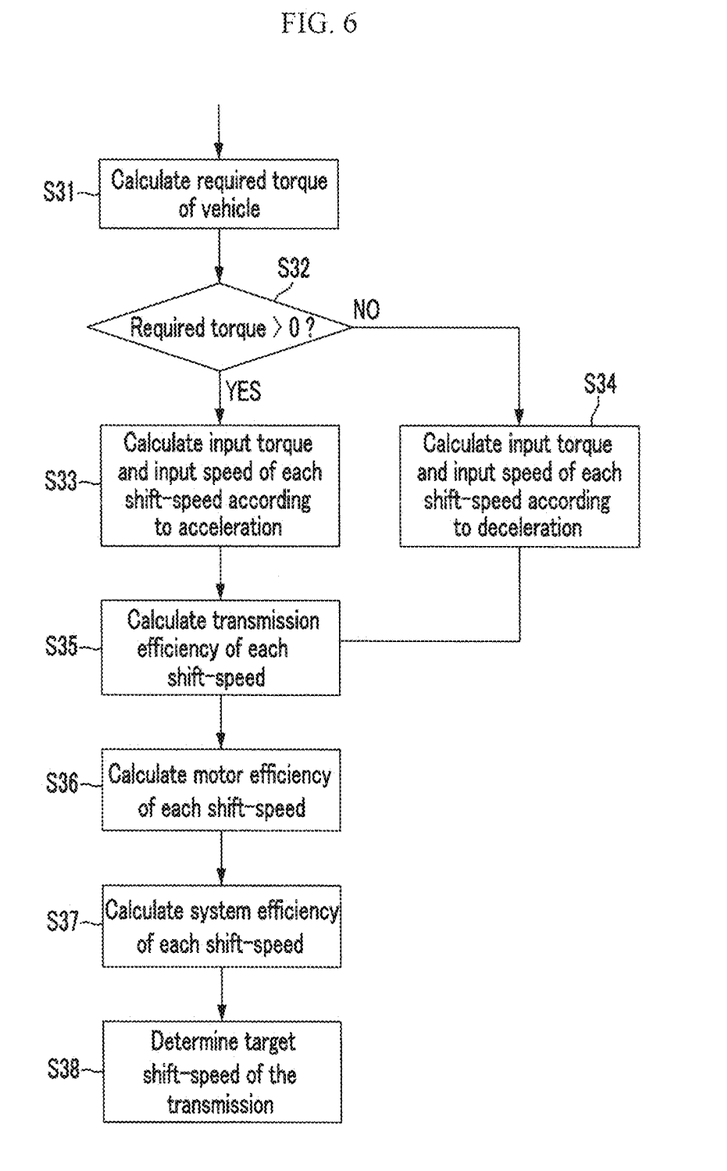
FIG. 6 is a flowchart illustrating a target shift-speed determining method according to an exemplary embodiment of the present inventive concept.

Referring to FIG. 3, the target shift-speed of the vehicle may be determined at step S30 when the vehicle maintains the CD mode at step S20. With reference to FIG. 6, the target shift-speed of the vehicle may be determined through the following process.

As shown in FIG. 6, the required torque of the vehicle may be calculated at step S31, and it may be determined whether the required torque of the vehicle is greater than zero at step S32.

When the required torque of the vehicle is greater than zero, it means that the vehicle has a status of acceleration. Thereby, input torque and an input speed of the transmission according to the acceleration of the vehicle may be calculated by using Equation 2 at step S33.

When the required torque of the vehicle is less than zero, it means that the vehicle has a status of deceleration. Thereby, input torque and an input speed of the transmission according to the deceleration of the vehicle may be calculated by using Equation 3 and Equation 4 at step S34.

The transmission efficiency of each shift-speed may be calculated by using the calculated input torque and the calculated input speed of the transmission at step S35. At this time, the transmission efficiency of each shift-speed can be obtained from the transmission efficiency map made of the input torques and the input speeds of the transmission.

Motor efficiency of each shift-speed may be calculated at step S36. At this time, the motor efficiency of each shift-speed can be obtained from the motor efficiency map made of the input torques and the input speeds of the transmission.

System efficiency of each shift-speed may be calculated at step S37. At this time, the system efficiency of each shift-speed may be calculated by multiplexing transmission efficiency and motor efficiency.

The target shift-speed of the transmission may be determined at step S38. The target shift-speed of the transmission may be determined as a most efficient shift-speed among system efficiencies of each shift-speed.

Referring back to FIG. 3, at step S40, it may be determined whether to change the shift-speed to the target shift-speed by comparing the system efficiency increasing rate with the mechanical loss rate.

Figure 7:
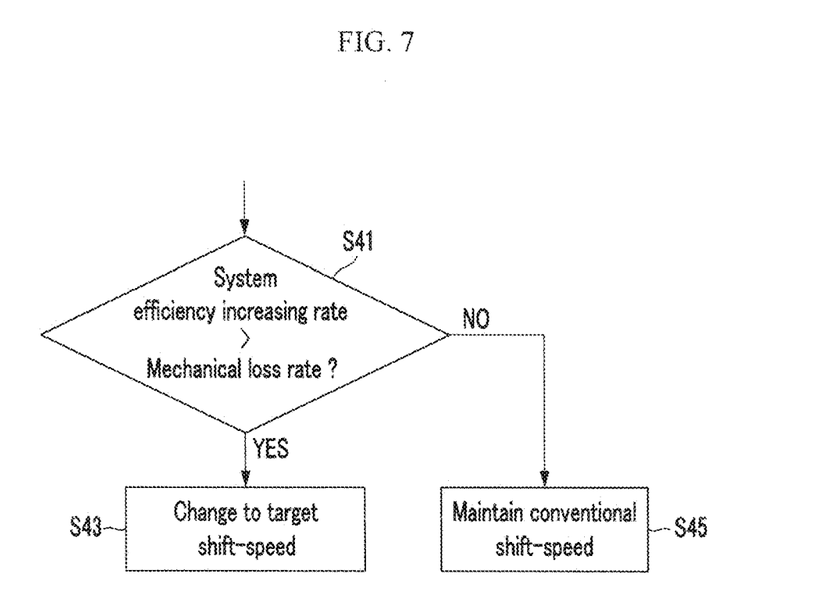
FIG. 7 is a flowchart illustrating a shift-speed change determining method according to an exemplary embodiment of the present inventive concept.

As shown in FIG. 7, the shift determining unit may compare the system efficiency increasing rate with the mechanical loss rate at step S41. The shift determining unit may change the shift-speed to the target shift-speed at step S43 only when the system efficiency increasing rate is higher than the mechanical loss rate at step S41. The shift determining unit may maintain the conventional shift-speed when the system efficiency increasing rate is less than or equal to the mechanical loss rate at step S45.

According to an exemplary embodiment of the present inventive concept, the shift-speed may be determined by using the transmission efficiency and the motor efficiency when a plug-in hybrid vehicle drives in the charge depleting mode, such that fuel consumption is reduced and performance is improved.

Further, since the shift-speed is changed by comparing the system efficiency with the loss rate generated at the shift-speed, fuel consumption may be reduced by frequent changing of the shift-speed.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A charge depleting mode control apparatus of a plug-in hybrid vehicle, comprising:
a driving information detector detecting driving information of a vehicle;
a mode determining unit determining whether a charge depleting (CD) mode is entered by using a state of charge (SOC) of a battery, provided from the driving information detector;
a shift-speed determining unit determining a target shift-speed when the mode determining unit determines that the CD mode is entered; and
a shift determining unit determining whether to change the target shift-speed determined by the shift-speed determining unit,
wherein the shift-speed determining unit calculates a system efficiency, and
wherein the shift determining unit determines whether a shift-speed is shifted by comparing the system efficiency calculated by the shift-speed determining unit with a system loss rate generated at a shift.

2. The charge depleting mode control apparatus of claim 1, wherein the mode determining unit determines the CD mode,
when a current driving mode is the CD mode and a current SOC provided from the driving information detector is higher than an SOC for entering a charge sustaining (CS) mode, or
when the current driving mode is the CS mode and the current SOC provided from the driving information detector is higher than an SOC for reentering the CD mode.

3. The charge depleting mode control apparatus of claim 1, wherein the shift-speed determining unit calculates system efficiency by using transmission efficiency and motor efficiency, and determine a most efficient shift-speed as the target shift-speed.

4. The charge depleting mode control apparatus of claim 1, wherein the shift determining unit changes speed when a system efficiency increasing rate that is generated when changing a speed to the target shift-speed is higher than a mechanical loss rate that is generated when changing the speed to the target shift-speed.

5. The charge depleting mode control apparatus of claim 2, wherein:
the mode determining unit determines to enter the CD mode by the SOC of the battery, and the charge depleting mode control apparatus further comprises an engine operation determining unit determining whether an engine operation is needed.

* * * * *